United States Patent
Guntupalli et al.

(10) Patent No.: US 12,069,747 B2
(45) Date of Patent: Aug. 20, 2024

(54) TENANT DEPLOYMENT OF MOBILE NETWORK COMPONENTS

(71) Applicant: Cisco Technology, Inc., San Jose, CA (US)

(72) Inventors: Ravi Kiran Guntupalli, Cumming, GA (US); Srinath Gundavelli, San Jose, CA (US); Abhishek Dhammawat, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 395 days.

(21) Appl. No.: 17/375,765

(22) Filed: Jul. 14, 2021

(65) Prior Publication Data
US 2023/0017423 A1    Jan. 19, 2023

(51) Int. Cl.
*H04W 76/10*    (2018.01)
*H04W 48/20*    (2009.01)
*H04W 68/00*    (2009.01)

(52) U.S. Cl.
CPC ........... *H04W 76/10* (2018.02); *H04W 48/20* (2013.01); *H04W 68/005* (2013.01)

(58) Field of Classification Search
CPC ... H04W 76/10; H04W 48/20; H04W 68/005; H04W 24/02
USPC ........ 370/329, 331; 455/62, 525, 435.1–444, 455/458
See application file for complete search history.

(56) References Cited

U.S. PATENT DOCUMENTS

| | | | |
|---|---|---|---|
| 2019/0174561 A1* | 6/2019 | Sivavakeesar | H04W 76/10 |
| 2019/0357131 A1 | 11/2019 | Sivavakeesar et al. | |
| 2020/0120022 A1* | 4/2020 | Stammers | H04L 12/4633 |
| 2022/0117015 A1* | 4/2022 | DeFoy | H04W 76/11 |

FOREIGN PATENT DOCUMENTS

| | | | |
|---|---|---|---|
| WO | 2018106868 A1 | 6/2018 | |
| WO | 2020150250 A1 | 7/2020 | |
| WO | 2021022966 A1 | 2/2021 | |

\* cited by examiner

*Primary Examiner* — Michael Y Mapa
(74) *Attorney, Agent, or Firm* — Edell, Shapiro & Finnan, LLC

(57) ABSTRACT

Disclosed are embodiments that leverage a central control plane of a managed 5G network service architecture across multiple serviced tenants by deploying tenant specific user plane function (UPF) and gNB components within tenant managed compute infrastructure. To enable this architecture, the disclosed embodiments assign gNBs and UPF instances to specific tenants and communicate those assignments to core components. Policies can be defined and applied to specific tenants from the central control plane. Inbound data routing to a specific tenant is accomplished by referencing a data store in the control plane that identifies which gNBs are assigned to a tenant associated with the incoming data. Those gNBs are then paged to service the incoming data.

23 Claims, 13 Drawing Sheets

| Octets | Bits | | | | | | | | |
|---|---|---|---|---|---|---|---|---|---|
| | 8 | 7 | 6 | 5 | 4 | 3 | 2 | 1 | |
| 1 to 2 | Type = 161 or free value from available range (decimal) ||||||||  402 |
| 3 to 4 | Length = n |||||||| 404 |
| 5 to (n+4) | Tenant Identifier (encoded as OctetString) |||||||| 406 |

FIG.4

TENANT DEPLOYMENT OF MOBILE NETWORK COMPONENTS

TECHNICAL FIELD

The present disclosure relates to wireless communications technology, and specifically to mobile network deployment architectures.

BACKGROUND

A transition is underway from existing Third Generation Partnership Project (3GPP) Fourth Generation (4G) networks to new Fifth Generation (5G) networks, which provide a service-oriented architecture for provisioning network services and resources in a dynamic, scalable, and customizable fashion (e.g. via micro-services or network function virtualization (NFV)). Mobile network architectures can be implemented using a software defined network (SDN) to deploy control and user plane separation (CUPS) architectures in which the data path and the control path for the mobile network are split across two planes, a data plane and a control plane. As the number of user equipment (UE) devices increases and as split data plane and control plane architectures become more prevalent for mobile networking deployments, efficient management of communication resources becomes more challenging.

BRIEF DESCRIPTION OF THE DRAWINGS

FIG. 4 shows a format of a tenant information element (IE) according to an example embodiment.

DESCRIPTION OF EXAMPLE EMBODIMENTS

Overview

Figure 1:
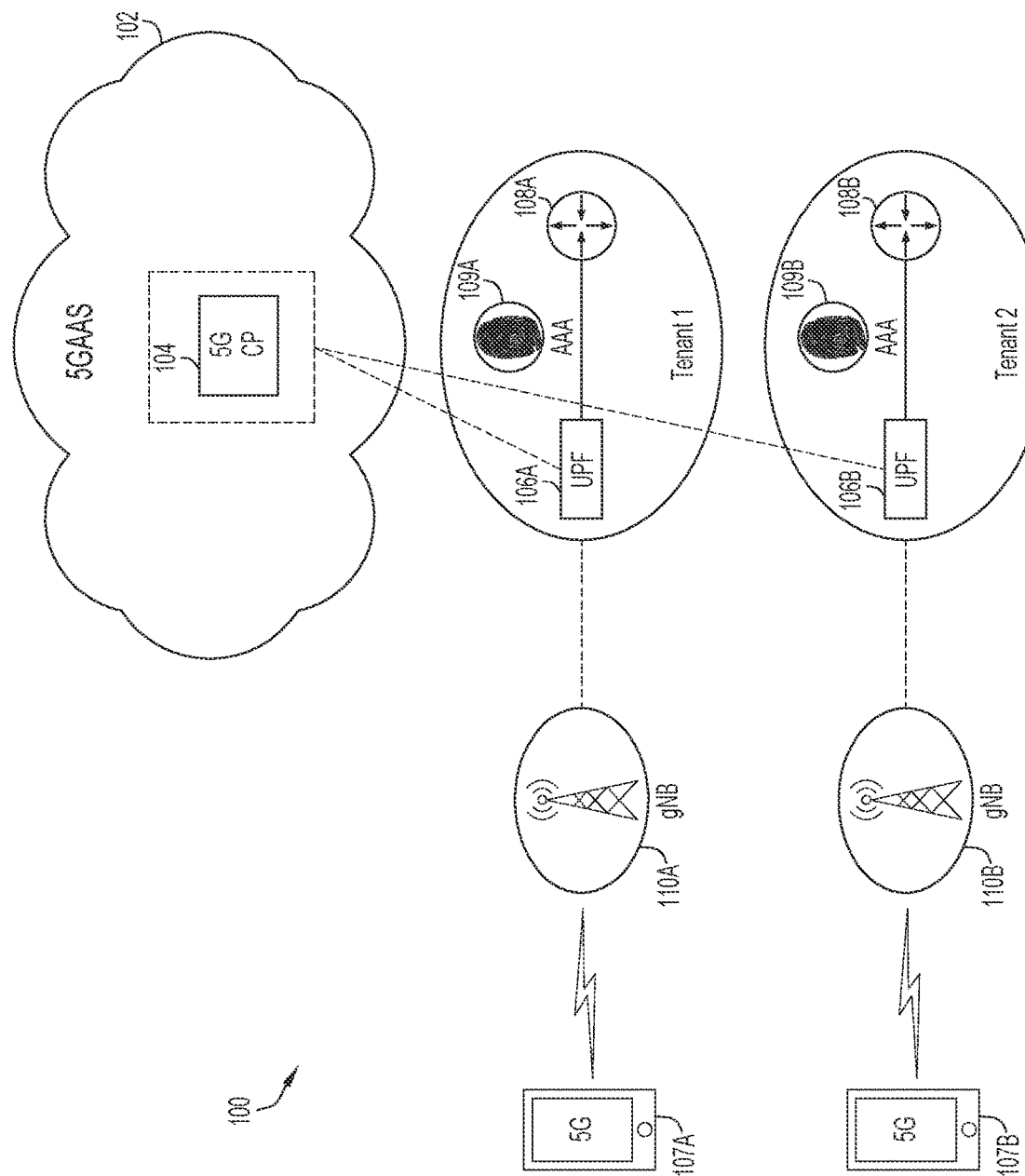
FIG. 1 is an overview diagram showing a system including a mobile network in which tenant deployments may be configured to facilitate operations involving tenant identifiers in accordance with an example embodiment.

Disclosed herein are embodiments that provide for tenant specific deployments of a UPF instance and one or more radio nodes that provides communication services via a multi-tenant control plane. In one form, a method includes obtaining, by a control plane of a mobile network, from a radio node, a setup request including an identifier of the radio node and a tenant identifier, obtaining, by the control plane from a UPF instance, an association request including an identifier of the UPF instance and the tenant identifier; and utilizing, by the control plane, the tenant identifier to select the radio node and the UPF instance for communication with a user equipment (UE) associated with a first tenant identified by the tenant identifier.

EXAMPLE EMBODIMENTS

The adoption of private Third Generation Partnership Project (3GPP) Fifth Generation (5G) and/or next Generation (nG) architectures for enterprise use-cases presents an opportunity to provide a 5G-as-a-Service (5GaaS) offering to service providers, managed or mobile service providers (MSPs), and cloud providers. A first possible architecture for such a solution deploys a 5G control plane (CP) and a 5G user plane (UP) in a provider's cloud. A second possible option is to deploy both the CP and UP at a customer's on premise location(s) or at least within a customer managed compute environment. A customer in this context is generally an enterprise network that is using a service provider to manage a dedicated private 5G network allocated for use by the enterprise network. Finally, a third option is to deploy the CP in a provider's managed compute environment and separately deploy the UP within a customer's compute environment, which may include at least some components at a customer's on premise location. When deploying the CP and UP within a common environment, such as with the first and second examples above, interactions between the CP and UP elements are local within the environment, and thus it is generally unnecessary to differentiate between different customer contexts.

The third option above provides some advantages, in that it can offer cost efficiencies associated with leveraging a single CP deployment across multiple different UPs, with each of the different UPs allocated to a different tenant. With this deployment model, since the CP is deployed within a different environment than the UP, the 3GPP interfaces are to involve context awareness (e.g., tenant awareness) to provide for proper interfacing between the CP and a tenant specific UP.

Thus, some of the disclosed embodiments provide protocol elements that include a tenant identifier when passing information between tenant specific components (which may be located on a tenant's premises) and the provider's multi-tenant CP. In contrast to existing 3GPP interfaces that operate within a single tenant context without any multitenancy, the disclosed embodiments propose a flow of messages, a look up of data structures and/or configuration elements that occur within a customer or tenant specific context. As one example, when a downlink packet is addressed to a UE, a tenant specific instance of a user plane function (UPF) will provide a downlink data notification (DDN) to the CP in the provider's environment. Upon receiving the packet, the CP determines a paging strategy for notifying the UE that the packet is available. A radio node paging strategy utilizes radio nodes that are deployed within the customer's network, and are thus also tenant specific. Thus, tenant context is provided in the protocol messages passed between network components. Additional tenant context may be provided in configuration elements and data structures.

In some of the disclosed embodiments, a radio node performs an initial registration indicating a tenant associated with the radio node. Thus, 3GPP interfaces proposed herein are modified to indicate said tenant associations. In accordance with embodiments herein, 3GPP message interfaces, such as the N2 and N4 reference points that provide interfaces between tenant specific elements and provider deployed multi-tenant elements, are enhanced to include tenant identifiers. In addition, when a tenant specific component includes CP functions, service based architecture (SBA) protocols are updated to include a tenant identifier. For example, some embodiments enhance one or more of the following interfaces to include tenant identifiers: the service-based interface for an Access and Mobility Function (AMF), referred to as the Namf interface; the service-based interface for a SMF, referred to as the Nsmf interface; the service-based interface for a Network Exposure Function (NEF), referred to as the Nnef interface; the service-based interface for a Policy Control Function (PCF), referred to as the Npcf interface; the service-based interface exhibited by a Unified Data Management (UDM) entity or instance, the service-based interface exhibited by an Application Function (AF), referred to as an Naf interface; the service-based interface exhibited by a Neighbor Relations Table (NRT), referred to as a Nnrt interface; the service-based interface exhibited by a Network Slice Selection Function (NSSF), referred to as a Nnssf interface; the service-based interface exhibited by an Authentication Server Function (NAUSF), referred to as a Nnausf interface; a service-based interface exhibited by a Unified Data Repository (UDR) element or instance, referred to as a Nudr interface; the service-based interface exhibited by an Unstructured Data Storage Function (UDSF), referred to as a Nudsf interface; the service-based interface exhibited by an Equipment Identity Register (5G-EIR), referred to as a N5G-eir interface; the service-based interface exhibited by a Network Data Analytics function (NWDAF), referred to as a Nnwdaf interface; the service-based interface exhibited by a Charging Function (CHF), referred to as a Nchf interface; or the service-based interface exhibited by a UE radio Capability Management Function (UCMF), referred to as a Nucmf interface. In some embodiments, one or more of the interfaces identified above are enhanced to support communications in which a tenant identifier is included in messages, signaling, etc. In some embodiments, tenant identifiers are added via new attributes that can be included within hypertext transfer protocol (HTTP) headers. For example, in some embodiments, a tenant identifier field is included in a request header, with the tenant identifier field specifying a tenant identifier of a sender of the HTTP message. In some embodiments, a syntax of the tenant identifier field is Tenant Id: <tenant id> with <tenant id> indicating a tenant identifier of a sender of an HTTP message. Thus, the provided interfaces support communications involving a tenant identifier parameter. In other words, the one or more interfaces reference a tenant identifier parameter. In other embodiments, other protocols are used to carry tenant identifiers.

Thus, the disclosed embodiments provide for deployment architectures that include a single physical facility that hosts a multi-tenant control plane and a user plane with cloud hosted authentication capabilities. For example, in some embodiments, a private 5G as a service offering includes control plane functions deployed in a cloud based implementation that is leveraged across multiple enterprises, with UPF instances being dedicated based on an enterprise software license. In some embodiments, UPF instances are deployed at enterprise locations or at least within infrastructure managed by the enterprise. gNB instances are also allocated to particular enterprises (tenants) and deployed at enterprise locations. The gNB instances communicate with the multi-tenant control plane as well as UPF instances assigned to the gNB's respective tenant.

Such a flexible deployment model is very useful in small enterprise deployments where a customer is not required to purchase a dedicated AMF/SMF and can instead purchase a license for a number of UE/PDU sessions and/or a given amount of network throughput. Including tenant identifiers in communication messages also facilitates support activities, such as assisting site reliability engineers (SREs) with debugging implementations more easily, and provides a mechanism for streamlining the collection of key performance indicators (KPIs) and other information more securely without risk of cross spillover of information.

The solution proposed here contrasts with alternative implementations that do not include tenant identifiers in the messages as proposed. These alternative implementation require a control plane to rely on out-of-band context information (e.g. such as which tenant is a request being made on behalf of). Reliance on out-of-band context is not reliable in some circumstances. Advantages of the disclosed embodiments relative to those that rely on out of band context is that the disclosed embodiments allow for the sharing of tenant specific components, such as gNBs and/or UPF instances, across multiple sub-tenants.

FIG. 1 is an overview diagram showing a system 100 involving a mobile network in which tenant deployments may be configured to facilitate operations involving tenant identifiers in accordance with an example embodiment. For the embodiment of FIG. 1, system 100 may be implemented to facilitate a 5G-as-a-Service (5GaaS) offering, however, it is to be understood that any other nG service may be facilitated using an architecture as illustrated in FIG. 1. The system 100 includes a centralized managed provider system 102 that includes a control plane (CP) 104. The CP 104 includes, in some embodiments, a combined Access and Mobility Management Function (AMF) and a Session Management Function (SMF). The CP 104 is in communication with components of the system 100 that are specific to particular tenants. In some embodiments, the CP 104 is deployed on computer infrastructure managed by a service provider, while components specific to a particular tenant are deployed on computing infrastructure managed by the respective tenant. As discussed above, this allows a managed service provider to leverage investments in a centralized control plane across multiple tenant deployments, which in some circumstances, are not large enough to justify the cost and management expense associated with a dedicated control plane deployment.

In the embodiment of FIG. 1, two User Plane Function (UPF) instances, are each specific to a different tenant. A first UPF instance 106A is assigned to provide services for the first tenant and the second UPF instance 106B is assigned to provide services for the second tenant. In some embodiments, the first UPF instance 106A is physically located at the first tenant's on-premises location. In some embodiments, the second UPF instance 106B is physically located at the second tenant's on-premises location. Wireless device 107A is associated with the first tenant and communicates via the first UPF instance 106A. Wireless device 107B is associated with the second tenant and communicates via the second UPF instance 106B. The first UPF instance 106A is in communication with a first data network 108A, while the second UPF instance 106B is in communication with a second data network 108B.

The first UPF instance 106A is deployed on infrastructure managed separately from infrastructure upon which the CP 104 is deployed. In some embodiments, as discussed above, the first UPF instance 106A is deployed at a tenant or customer's site, or at least deployed on cloud based resources managed or controlled by the customer. In some embodiments, the first UPF instance 106A is deployed on computing infrastructure managed by the first tenant. The second UPF instance 106B is also deployed on infrastructure managed separately from the infrastructure upon which the CP 104 is deployed. The control plane selectively communicates with each of the first UPF instance 106A or second UPF instance 106B depending on a tenant associated with the communication.

Each of the first tenant and the second tenant maintain their own enterprise policy function, shown as enterprise policy function 109A and enterprise policy function 109B respectively. In some embodiments, the CP 104 queries a tenant specific enterprise policy function (e.g. the enterprise policy function 109A or enterprise policy function 109B) to obtain policy data. In some instances, an enterprise policy function (e.g., enterprise policy functions 109A and 109B) can be implemented as an Authentication, Authorization, and Accounting (AAA) function, which may be capable of supporting any combination of Remote Authentication Dial-In User Service (RADIUS) protocols, Diameter protocols, and/or the like. Each of the tenants is also assigned one or more gNBs. FIG. 1 shows the system 100 assigns a first gNB 110A to the first tenant and a second gNB 110B to the second tenant. Generally, a service provider maintains AUSF and UDM instances on a per tenant basis. A tenant specific UDM stores authentication credentials for devices associated with the particular tenant.

Figure 2:
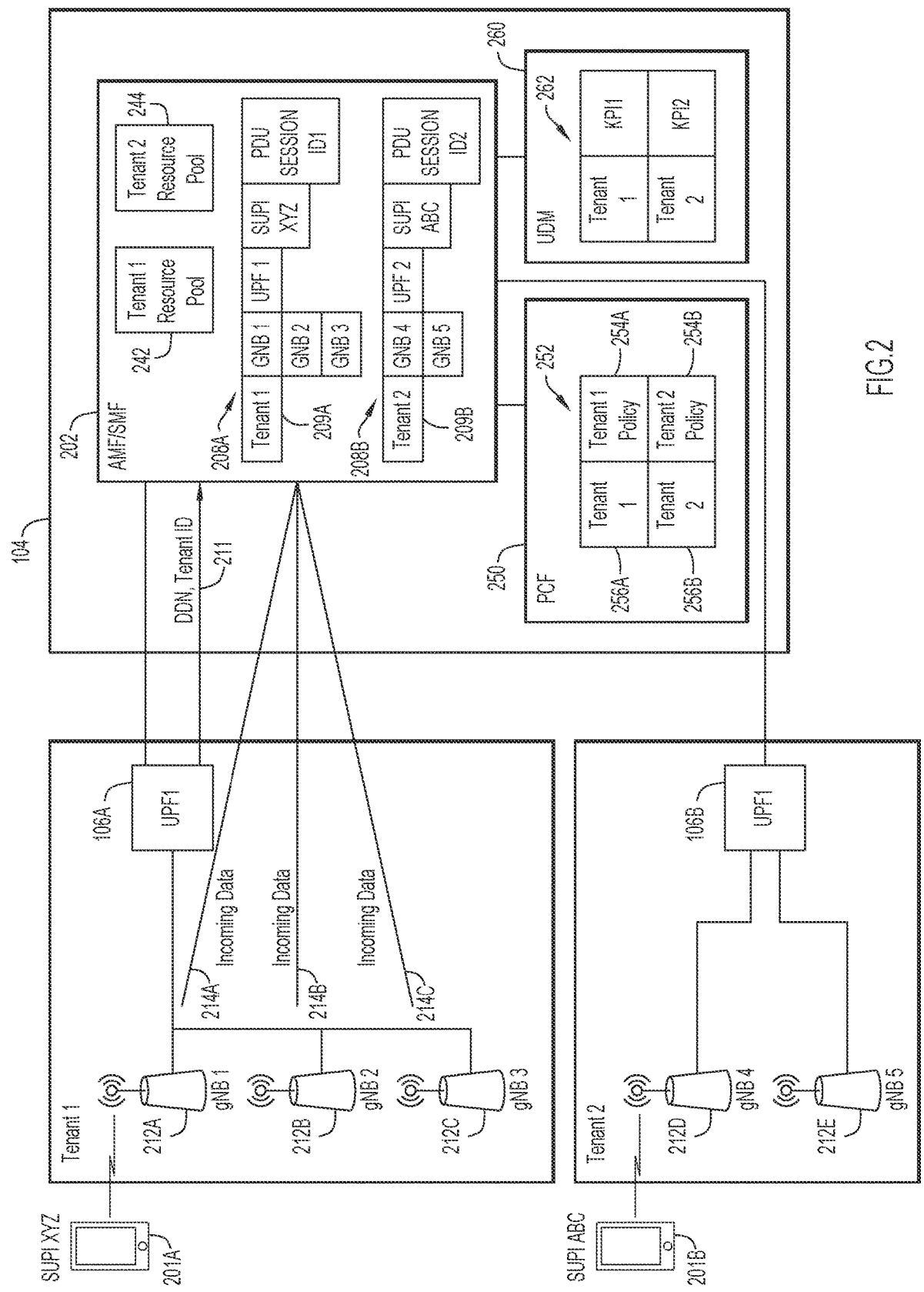
FIG. 2 is a detailed view of a portion of the mobile network service offering of FIG. 1.

FIG. 2 is a detailed view of a portion of the system 100 of FIG. 1. FIG. 2 shows the CP 104 from FIG. 1, and two tenant deployments including the first UPF instance 106A and the second UPF instance 106B of the first and second tenants respectively. A user equipment (UE) 201A is associated with the first tenant and is shown in communication with the gNB 212A. A UE 201B is associated with the second tenant and is in communication with the gNB 212D.

FIG. 2 also illustrates a PCF instance 250. The PCF instance 250 stores a policy information 252. Some of the disclosed embodiments provide for a policy to be configured that is specific to a particular tenant. Thus, as illustrated in FIG. 2, the policy information 252 includes a first policy 254A mapped to a tenant identifier 256A that identifies the first tenant. Thus, the policy information 252 defines that the first policy 254A is applied to communications that occur on behalf of the first tenant (e.g. communications initiated or received by a UE associated with the first tenant). The policy information 252 also includes a second policy 254B mapped to a tenant identifier 256B that identifies the second tenant. Thus, the policy information 252 defines that the second policy 254B is applied to communications that occur on behalf of the second tenant. In some other embodiments, tenant specific policy data is stored by a tenant, and the CP 104 queries an enterprise policy function of the tenant to obtain the tenant specific policy data.

The first policy 254A or the second policy 254B defines one or more of an access control list, or one or more quality of service parameters to apply to communications that occur on behalf of a tenant to which the policy is applied. Thus, the first policy 254A and/or the second policy 254B define a quality of service policy to be applied to the configured tenant.

In some embodiments, one or more attributes (e.g. access control lists, quality of service parameters) of the first policy is provided to the first UPF instance 106A. One or more attributes of the second policy 254B are provided to the second UPF instance 106B. Each UPF instance is configured to then communicate based on the one or more attributes. For example, in some embodiments, when a UPF transmits a PFCP session establishment request, one or more of the policy attributes are included in the PFCP session establishment request. For example, some embodiments of a PFCP session establishment request indicate an access control list and/or one or more quality of service parameters.

In some embodiments, the policy information 252 is managed by a user interface provided by the CP 104. Thus, in some embodiments, the user interface presents a user interface and receiving input from an administrator. The input defines configuration information that results in the control plane assigning a first policy to a first tenant, and assigning a second policy to a second tenant. The first policy defines, in some embodiments, an access control list (ACL) and/or a Quality of Service (QoS) policy to the first tenant. The second policy defines, in some embodiments, a second ACL and/or a second QoS policy to the second tenant.

FIG. 2 also illustrates a UDM instance 260. The UDM instance 260 includes a mapping 262 that maps a tenant identifier to one or more other data, such as key performance indicators (KPIs) associated with a particular tenant. Based on the mapping 262 maintained by the UDM instance 260, some embodiments provide for the collection of diagnostic and/or assurance information on a per tenant basis. This can be helpful when reporting on communications performance and/or service level agreements associated with a particular tenant. An example of an assurance process that is supported based on the example of FIG. 2 and the UDM instance 260 is discussed below with respect to FIG. 11. In some embodiments, the UDM instance 260 maintains subscriber identity module (SIM) credentials for each end user device (e.g. UE) associated with a particular tenant. For example, a SIM-1 and SIM-2 credentials associated with a first tenant, and a SIM-3 and SIM-4 credentials associated with a second tenant. In some embodiments, AUSF/UDM instances are maintained on a per tenant basis. For example, it can be beneficial, in at least some circumstances, to locate the AUSF/UDM close to the CP 104. For example, a service provider may on-board the SIMs, and the CP 104 then uses that information for authentication.

FIG. 2 shows that the CP 104 includes an AMF/SMF instance 202. The AMF/SMF instance 202 maintains mappings that associate tenant information to additional attributes associated with providing communication services to each of the tenants. As shown, the AMF/SMF 202 stores information associated with a first tenant in mapping 208A.

The mapping 208A includes a plurality of mappings. For example, the mapping 208A includes a first mapping from the tenant identifier 209A to each of the gNB 212A, gNB 212B, and gNB 212C.

The mapping 208A also includes a second mapping from the tenant identifier 209A to the first UPF instance 106A. In some embodiments, the first UPF instance 106A may be identified based on one or more of a hostname of a machine running the first UPF instance 106A, an Internet Protocol (IP) address of the first UPF instance 106A, or a network port number upon which the first UPF instance 106A is listening for messages, a node/instance identifier, and/or any other identifier that may be used to uniquely identify the UPF instance. The mapping 208A also maps the tenant 209A to a Subscription Permanent Identifier (SUPI) that identifies the UE 201A. The mapping of the tenant 209A to the SUPI of a UE indicates a UE association with the first tenant identified via tenant 209A. The mapping 208A also maps the tenant identifier 209A to a protocol data unit (PDU) session identifier, discussed in more detail below. In various embodiments, a UE may be identified using any combination of an International Mobile Subscriber Identity (IMSI), SUPI, a Subscription Concealed Identifier (SUCI), and/or the like.

The mapping 208B maps information similar to the mapping 208A. In particular, the mapping 208B includes a first mapping of a tenant identifier 209B identifying the second tenant to a gNB 212D and to a gNB 212E, which are associated with the second tenant. The mapping 208A also maps from the tenant identifier 209B to an identifier of the second UPF instance 106B. As discussed above, an identifier of the second UPF instance 106B is, in some embodiments, one or more of a hostname, Internet Protocol (IP) address, or network port number, node/instance identifier, etc. upon which the second UPF instance 106B is listening for messages. The mapping 208B also maps the tenant identifier 209B to a SUPI that identifies the UE 201B, and thus a UE association with the second tenant. The mapping 208B also maps the tenant identifier 209B to a PDU session identifier, discussed in more detail below.

FIG. 2 shows that the AMF/SMF instance 202 receives a downlink data notification 211 from the first UPF instance 106A. In some embodiments, the downlink data notification 211 indicates data that is available for providing to a UE. In some embodiments, the downlink data notification 211 indicates the first UPF instance 106A, and the AMF/SMF instance 202 then determines the tenant based on the assignment of the first UPF instance 106A to the first tenant, and the indicated UPF instance in the downlink data notification. In some alternate embodiments, the downlink data notification 211 itself includes the tenant identifier for Tenant 1 that indicates a destination for the downlink data notification (DDN) 211.

The AMF/SMF instance 202 then consults the mapping 208A to determine which gNBs are associated with the tenant to which the incoming data is destined. Based on the mapping 208A, the AMF/SMF instance 202 determines that each of gNB 212A, gNB 212B, and gNB 212C are assigned to the first tenant. Thus, the AMF/SMF instance 202 sends a paging message 214A to the gNB 212A, a second paging message 214B to the gNB 212B, and a third paging message 214C to the gNB 212C. Each of the paging messages indicate that the incoming data is available. The UE 201A is in communication with the gNB 212A, and the incoming data is provided to the UE 201A.

FIG. 2 also illustrates that the AMF/SMF instance 202 maintains resource pools for each of the two tenants. FIG. 2 shows a first resource pool 242 assigned to tenant 1 communications and a second resource pool 244 assigned to tenant 2 communications. The first resource pool 242 and the second resource pool 244 include a variety of different compute resources, depending on embodiment. For example, the first resource pool 242 and/or the second resource pool 244 include one or more of buffers, IP addresses, or other compute resources. The AMF/SMF instance 202 is configured to condition operations performed on behalf of a particular tenant based on availability of resources from a resource pool assigned to the particular tenant. If the AMF/SMF instance 202 determines that the tenant specific pool does not have adequate resources to perform an operation, the AMF/SMF instance 202 rejects or otherwise denies performance of the operation.

In addition to various operations discussed for techniques herein, an AMF, such as AMF of the AMF/SMF instance 202, facilitates, in at least some embodiments, access and mobility management control/services for one or more UE, such as the UE 201A or the UE 201B, to facilitate registration, authentication, etc. for one or more UE to connect to the mobile core network. In addition to various operations discussed for techniques herein, an SMF, such as SMF included in the AMF/SMF instance 202, is responsible, in at least some embodiments, for UE Protocol Data Unit (PDU) session management (SM), with individual functions/services being supported on a per-session basis in order to facilitate data transfer(s) between a UE and one or more data network(s). Generally, a UPF, such as the first UPF instance 106A and/or the second UPF instance 106B, operate, in at least some embodiments, as a Virtual or Virtualized Network Function (VNF) to provide packet routing and forwarding operations for user data traffic and may also perform a variety of functions such as packet inspection, traffic optimization, Quality of Service (QoS) enforcement, policy enforcement and user data traffic handling (e.g., to/from one or more data network(s)), as well as billing operations (e.g., accounting, etc.) for sessions of the UE 201A and/or UE 201B. Typically a PCF, such as PCF 250, provides policy rules (e.g., network slicing, roaming, mobility management, etc.) for control plane functions and supports quality of service policy and charging control functions. Typically, a UDM, such as the UDM 260, stores subscription data for subscribers (e.g., UE 201A/201B) that can be retrieved and/or otherwise obtained/utilized during operation of system 100, typically via a UDR with which the UDM can interface.

A gNodeB, such as any of the gNodeBs 212A-212E, implement, in some embodiments, a wireless wide area (WWA) (e.g., cellular) air interface and, in some instances also a wireless local area (WLA) (e.g., Wi-Fi®) air interface, for any combination of Radio Access Technology (RAT) types (sometimes referred to more generally as 'accesses') for a RAN, such as 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses, such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, any of the gNodeB 212A-212E include hardware and/or software to perform baseband signal processing (such as modulation/demodulation) as well as hardware (e.g., baseband processors (modems), transmitters and receivers, transceivers, and/or the like), software, logic, and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 201A and/or UE 201B, in at least some embodiments, connect to one of the gNodeBs 212A-212E for one or more sessions (e.g., voice, video, data, gaming, combinations thereof, etc.).

A UE, such as UE 201A and/or UE 201B, are associated, in some embodiments, with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100.

Figure 3:
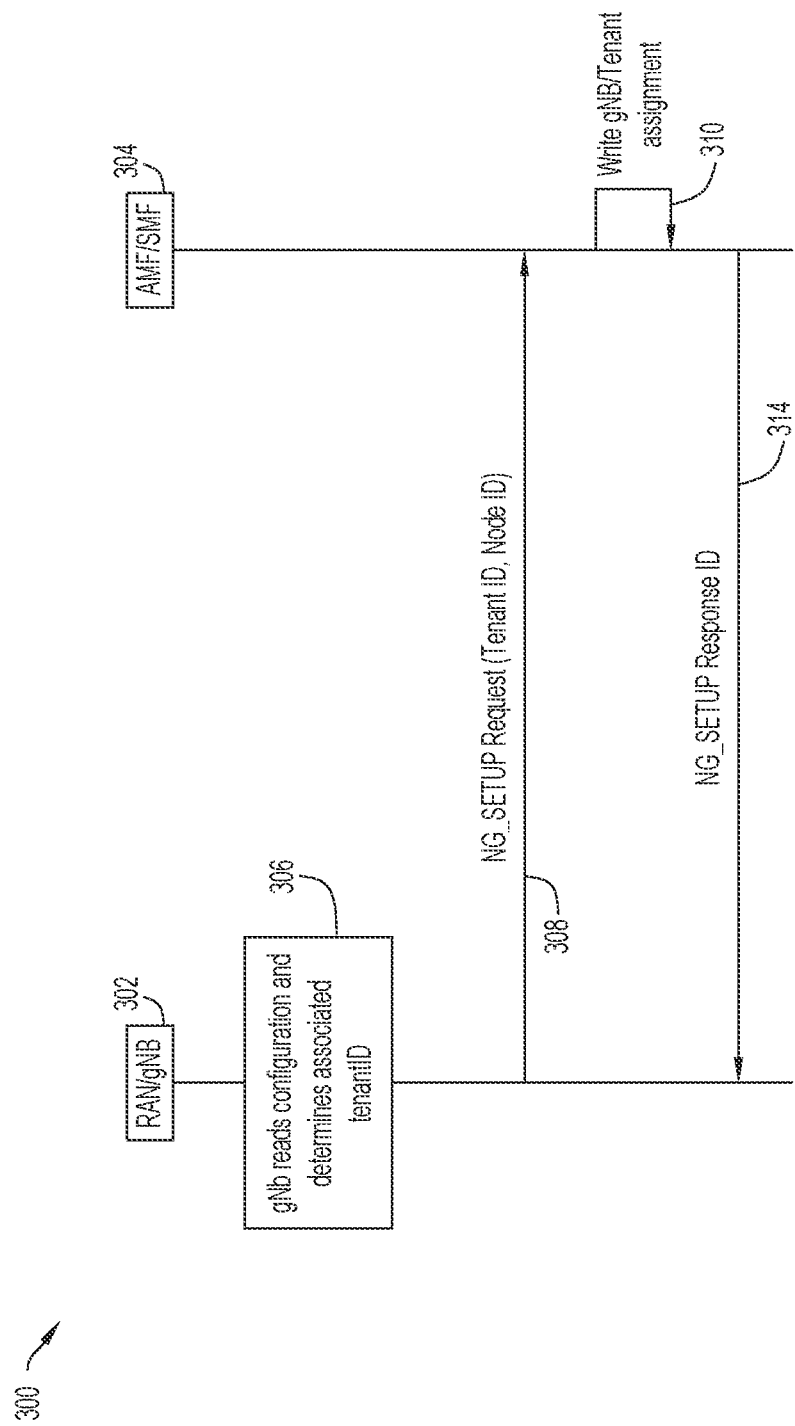
FIG. 3 is a sequence diagram illustrating registration of a tenant aware gNodeB (gNB) in accordance with an example embodiment.

FIG. 3 is a sequence diagram 300 illustrating registration of a tenant aware gNB in accordance with an example embodiment. FIG. 3 shows a tenant aware gNB 302 reads configuration information in step 306. The configuration information indicates a tenant identifier to which the tenant aware gNB 302 is assigned. The gNB 302 then transmits, to the AMF/SMF 304, a NG SETUP REQUEST message at communication 308 that indicates the tenant ID. In at least some embodiments, the NG SETUP REQUEST message also indicates a node identifier of the gNB 302. The AMF/SMF 304, upon receiving the NG SETUP REQUEST message, records, via a write operation 310, the assignment of the tenant identifier to the tenant aware gNB 302 via a tenant mapping associating the tenant identifier indicated by the message to the node identifier of the tenant aware gNB 302. The tenant mapping is stored in at least some embodiments, in a data store, storage, memory, or other stable storage). The AMF/SMF 304 also responds to the NG SETUP REQUEST via the NG SETUP RESPONSE message at communication 314.

FIG. 4 shows a format of a tenant information element (IE) 400 according to an example embodiment. Tenant information element 400 includes a type field 402, length field 404, and tenant identifier field 406. The type field 402 is two octets in at least some embodiments. In some embodiments, a value of 161 in the type field 402 indicates the tenant information element 400 indicates a tenant identifier. In other embodiments, a different value is predefined to indicate the tenant information element 400 indicates a tenant identifier. The length field 404 is two bytes in some embodiments. The length field 404 stores a length of the tenant identifier field 406. The tenant identifier field 406 stores a tenant identifier value. In some embodiments, the tenant identifier is encoded in the tenant identifier field 406 as an octet string that uniquely identifies the tenant.

Figure 5:
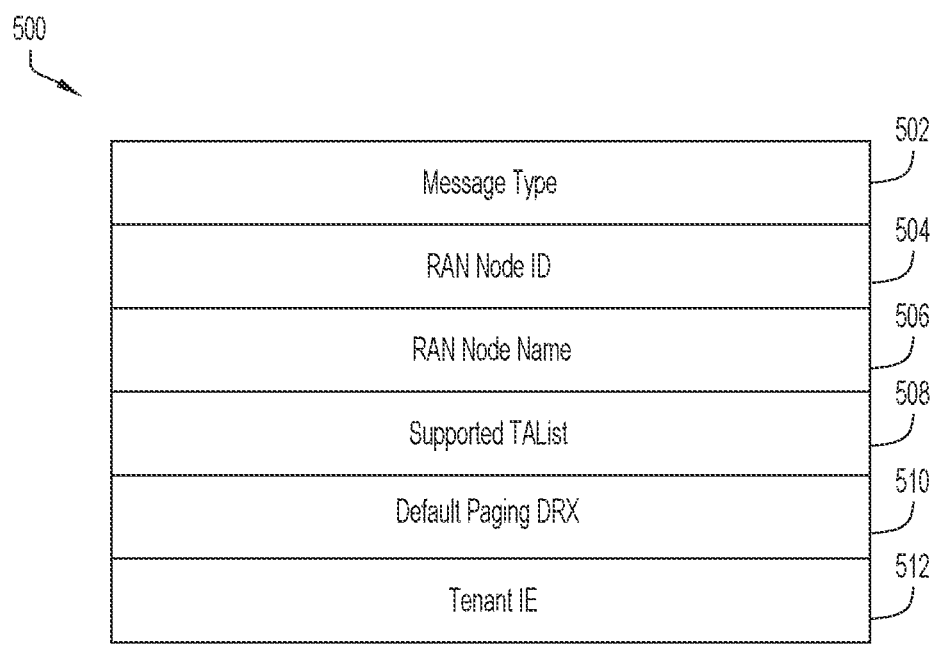
FIG. 5 illustrates a format of a NG setup request message in accordance with an example embodiment.

FIG. 5 illustrates a format of a NG setup request message 500 in accordance with an example embodiment. The NG setup request message includes one or more information elements. For example, the NG setup request message 500 includes a message type field 502, node identifier information element 504, a node name information element 506, a supported tracking area list information element 508, and a default paging discontinuous reception (DRX) information element 510, and a tenant information element 512. In some embodiments, the tenant information element 512 is equivalent to the tenant information element 400 discussed above with respect to FIG. 4.

As discussed above with respect to FIG. 3, in some embodiments, a gNB is assigned, via configuration information, to provide communication services for a particular tenant. The gNB reads the configuration information and registers with an AMF, via a NG Setup Request message (e.g. analogous the NG setup request message 500), and specifies the gNB's tenant assignment via the tenant IE 512.

Figure 6:
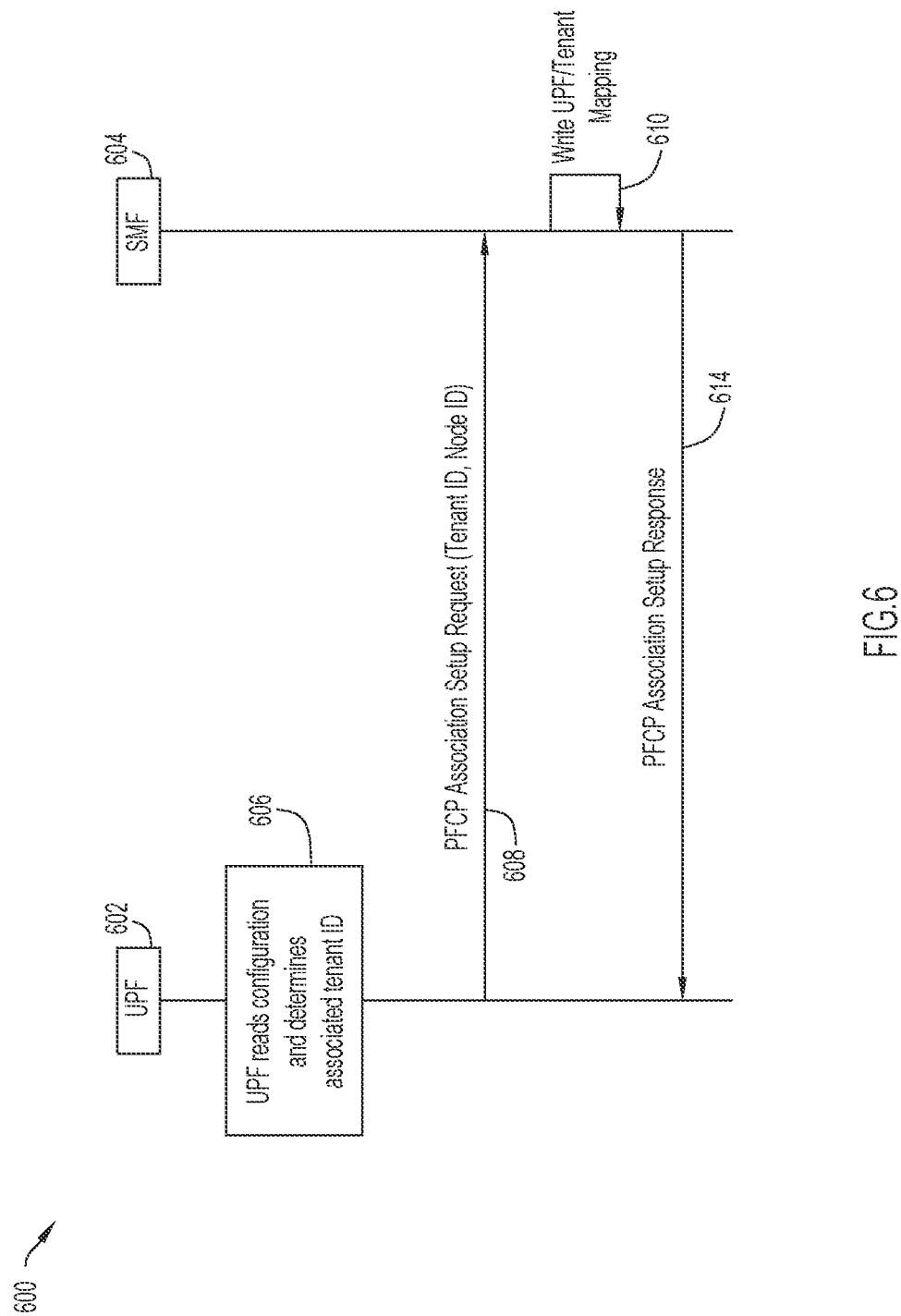
FIG. 6 is a sequence diagram illustrating association setup of a tenant aware User Plane Function (UPF) instance with a Session Management Function (SMF) instance in accordance with an example embodiment.

FIG. 6 is a sequence diagram 600 illustrating association setup of a tenant aware UPF instance with an SMF instance 604 in accordance with an example embodiment. FIG. 6 shows a tenant aware UPF instance 602 reading configuration information in step 606 to determine a tenant identifier to which the UPF instance 602 is assigned. The UPF instance 602 then sends a packet forwarding control protocol (PFCP) association setup request message at communication 608 to the SMF instance 604. Upon receiving the PFCP association setup request message, the SMF instance 604 stores a mapping between the UPF instance 602 and the tenant identifier, via a write operation 610, (e.g., in a data store). An example of the mapping between the UPF instance 602 and the tenant identifier is shown with respect to mapping 208A or mapping 208B of FIG. 2. Note that the mapping, in some embodiments, associates a tenant identifier with network connectivity information for the UPF instance 602, such as one or more of a hostname, IP address, network port number, node/instance ID, and/or the like. Based on the connectivity information, the control plane is able to communicate with the UPF instance. The SMF instance 604 then also sends a PFCP association setup response message at communication 614 to the UPF instance 602.

Figure 7A:
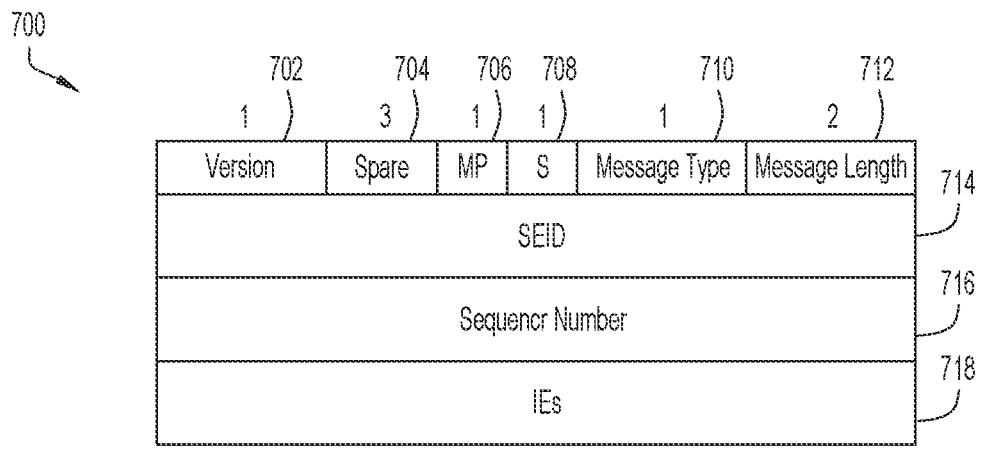
FIG. 7A shows a format of a packet forwarding control protocol (PFCP) association message in accordance with an example embodiment.

FIG. 7A shows a format of a PFCP association message 700 in accordance with an example embodiment. As discussed above with respect to FIG. 6, some embodiments of the PFCP association message in accordance with this disclosure specify a tenant identifier associated with the request. In some embodiments, the tenant identifier is provided via inclusion of a tenant identifier information element, as discussed above for example with respect to FIG. 4.

The PFCP association message includes a version field 702, spare field 704 (3 bits), an MP field 706 (one bit), and an S field 708 (one bit), a message type field 710 (one byte), and a message length field 712 (two bytes). The PFCP association message 700 also optionally includes a security element identifier (SEID) field 714 based on a value in the S field 708. The PFCP association message 700 also includes a sequence number field 716 and an IEs field 718, which includes zero or more information elements.

Figure 7B:
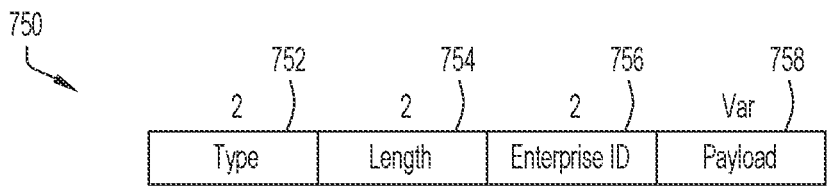
FIG. 7B shows a format of an information element of a PFCP association message in accordance with an example embodiment.

FIG. 7B shows a format of an information element 750 of a PFCP association message in accordance with an example embodiment. The information element 750 includes a type field 752, length field 754, an optional enterprise identifier field 756, and a payload field 758. In some embodiments, a PFCP association message, such as the PFCP association message 700 of FIG. 7A, includes an information element that conforms to the format of the information element 750 of FIG. 7B, that specifies a tenant identifier value. For example, the information element 750 of the PFCP association message 700 includes, in some embodiments, one or more of the fields discussed above with respect to tenant IE 400 of FIG. 4. Note that the information element 750 is just one example of identifying a tenant and encoding the tenant information in a message. Other embodiments encode the tenant information in a different manner.

Figure 7C:
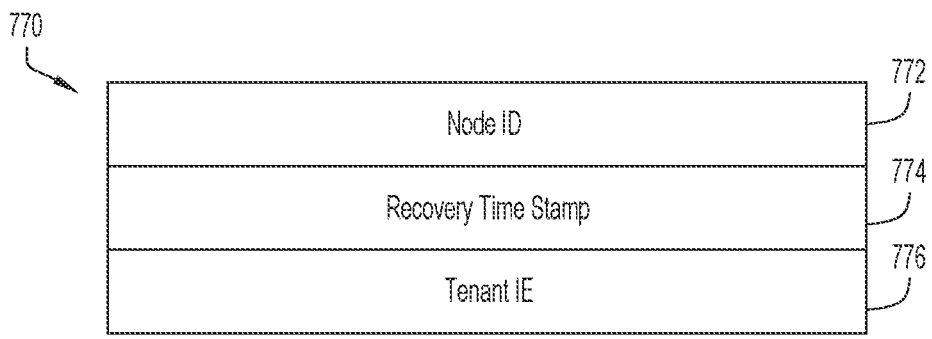
FIG. 7C illustrates IEs present in a PFCP association setup request message in accordance with an example embodiment.

FIG. 7C illustrates IEs present in a PFCP association setup request message in accordance with an example embodiment. The IEs 770 include a node identifier IE 772, a recovery time stamp IE 774, and a tenant IE 776. In some embodiments, the tenant IE 776 conforms to the tenant IE 400 discussed above with respect to FIG. 4. In some embodiments, the IEs field 718 discussed above with respect to FIG. 7A include one or more IEs in the IEs 770 of FIG. 7C.

Figure 8:
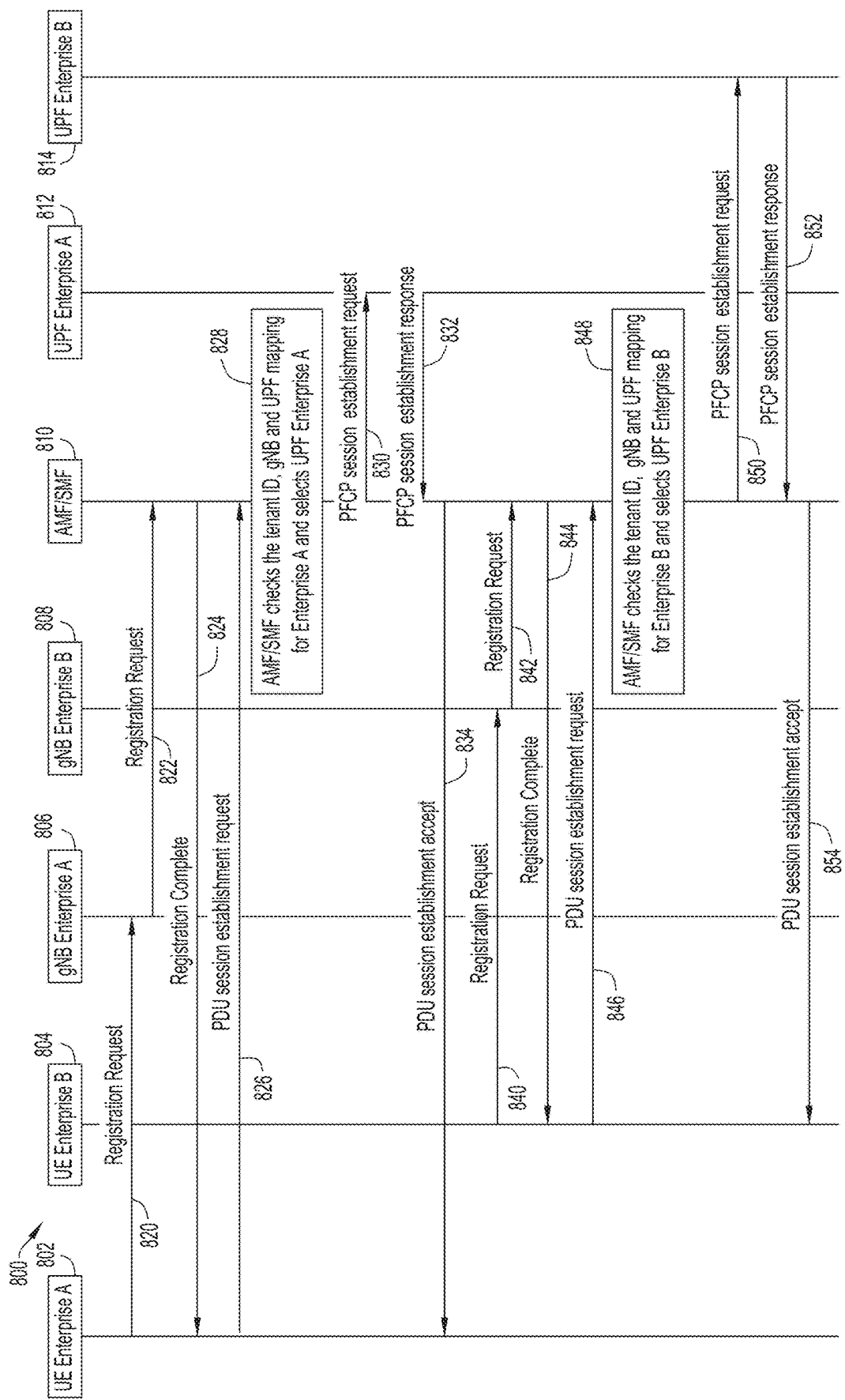
FIG. 8 is a sequence diagram of a session establishment process performed by two UE devices associated with two different tenants in accordance with an example embodiment.

FIG. 8 is a sequence diagram 800 of a session establishment process performed by two UE devices associated with two different tenants in accordance with an example embodiment. FIG. 8 shows a first UE 802 associated with a first tenant and a second UE 804 associated with a second tenant. Also shown are a first gNB 806 associated with the first tenant and a second gNB 808 associated with the second tenant. FIG. 8 also illustrates an AMF/SMF instance 810, and two UPF instances, a first UPF instance 812 associated with the first tenant, and a second UPF instance 814 associated with the second tenant. The communication message flows discussed with respect to FIG. 8 occur after each gNB and each UPF instance has completed its respective setup request and association processes with the AMF/SMF 810. As a result of these setup request and association processes, the AMF/SMF 810 establishes mapping between each gNB and each UPF instance to a particular tenant identifier value.

The first UE 802 sends a registration request including the SUPI for the first UE 802 at communication 820 to a respective gNB to which it is in communication, the first gNB 806 in this example, which forwards the registration request, at communication 822, to the AMF/SMF 810. Because the first gNB 806 is associated with the first tenant (e.g. via mapping analogous to mapping 208A or mapping 208B of FIG. 1), the AMF/SMF810 determines the first UE 802 is associated with the first tenant. After processing the registration request, the AMF/SMF 810 sends a registration complete message at communication 824 to the first UE 802. At communication 826, the first UE 802 then sends a session request that includes the SUPI for the first UE 802 (e.g., a PDU session establishment request) via the first gNB 806 to the AMF/SMF 810. Upon receiving the session request, the AMF/SMF 810 then determines, at step 828, that the first UPF instance 812 is appropriate for the first UE 802, given that the first UE 802 is also associated with the first tenant. Thus, the AMF/SMF 810 selects the first UPF instance 812 to provide communication services to the first UE 802. The AMF/SMF 810 then sends a session request at communication 830 (e.g. a PFCP session establishment request) to the first UPF instance 812 to establish a session on behalf of the first UE 802. Upon receiving the session request at communication 830, the first UPF instance 812 establishes a session for the first UE 802 and sends a session establishment response message at communication 832 (e.g. a PFCP session establishment response message) to the AMF/SMF 810, which then sends a session establishment accept message at communication 834 (e.g. PFCP session establishment accept message) to the first UE 802. Upon receiving the session establishment response message, the AMF/SMF stores a mapping of a session identifier indicated in the session establishment response message (assuming the session was successfully established), to a tenant ID associated with the session, based on the determination in step 828.

The second UE 804 sends a registration request 840 to its respective gNB, the second gNB 808, which forwards a registration request at communication 842 to the AMF/SMF 810. After processing the registration request from communication 842, the AMF/SMF 810 sends a registration complete message in communication 844 to the second UE 804. The second UE 804 then sends a session request in communication 846 (e.g., PDU session establishment request) to the AMF/SMF 810. Upon receiving the session request from communication 846, the AMF/SMF 810 then determines that the second UPF instance 814 is associated with the first tenant at step 848, and therefore sends a session request at communication 850 (e.g. a PFCP session establishment request) to the second UPF instance 814 to establish a session on behalf of the second UE 804. Upon receiving the session request in communication 850, the second UPF instance 814 establishes a session for the second UE 804 and sends a session establishment response message at communication 852 (e.g., a PFCP session establishment response message) to the AMF/SMF 810, which then sends an accept message in communication 854 (e.g. a PDU session establishment accept message) to the second UE 804.

Figure 9:
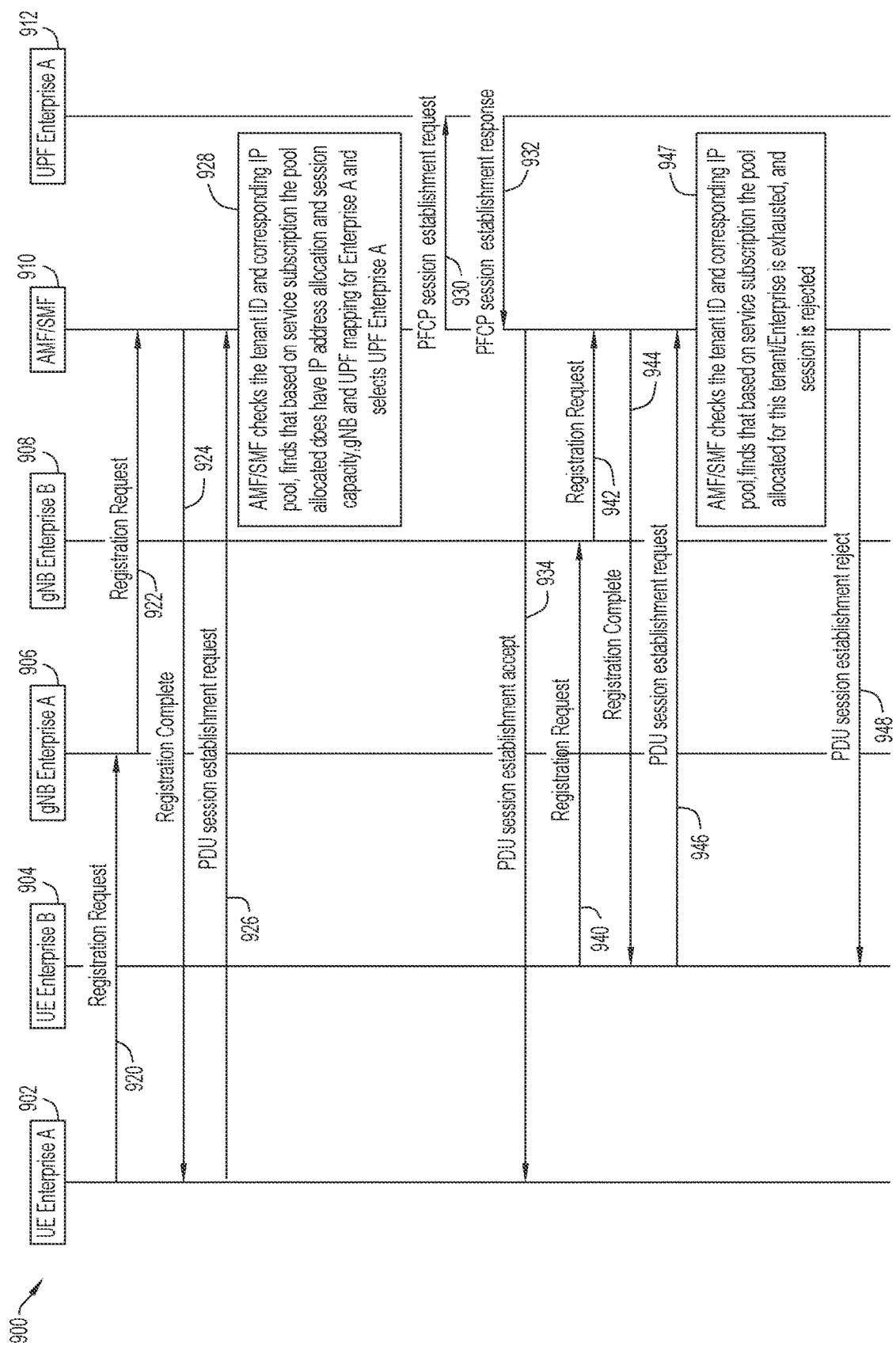
FIG. 9 is a sequence diagram of a session establishment process performed by two UE devices associated with two different tenants in accordance with an example embodiment.

FIG. 9 is a sequence diagram 900 of a session establishment process performed by two UE devices associated with two different tenants in accordance with an example embodiment. FIG. 9 shows a first UE 902 associated with a first tenant and a second UE 904 associated with a second tenant. Also shown are a first gNB 906 associated with the first tenant and a second gNB 908 associated with the second tenant. FIG. 9 also illustrates an AMF instance 910, and a first UPF instance 912 associated with the first tenant.

The first UE 902 sends a registration request at communication 920 to its respective gNB, the first gNB 906, which forwards a registration request at communication 922 to the AMF/SMF 910. After processing the registration request, the AMF/SMF 910 sends a registration complete message at communication 924 to the first UE 902. The first UE 902 then sends a PDU session establishment request at communication 926 to the AMF/SMF 910. Upon receiving the PDU session establishment request, the AMF/SMF 910 then determines at step 928 that the first UPF instance 912 is associated with the first tenant, and therefore sends a PFCP session establishment request at communication 930 to the first UPF instance 912 to establish a session on behalf of the first UE 902. Upon receiving the PFCP session establishment request, the first UPF instance 912 establishes a session for the first UE 902 and sends a PFCP session establishment response message at communication 932 to the AMF/SMF 910, which then sends a PDU session establishment accept message at communication 934 to the first UE 902.

The second UE 904 sends a registration request at communication 940 to its respective gNB, the second gNB 908, which forwards a registration request at communication 942 to the AMF/SMF 910. After processing the registration request at 942, the AMF/SMF 910 sends a registration complete message at communication 944 to the second UE 904. The second UE 904 then sends a PDU session establishment request in communication 946 to the AMF/SMF 910. Upon receiving the PDU session establishment request in communication 946, the AMF/SMF 910 then determines that a resource pool associated with the tenant identifier specified for the second UE is exhausted. For example, if the resource pool is a pool of IP addresses, in some circumstances, all of the IP addresses assigned to the pool have been allocated, and thus, there are no available IP addresses to assign to the PDU session being established. As a result of the exhaustion, the AMF/SMF 910 decides, in step 947, to reject the PDU session establishment request, and sends a PDU session establishment reject message in communication 948.

Figure 10:
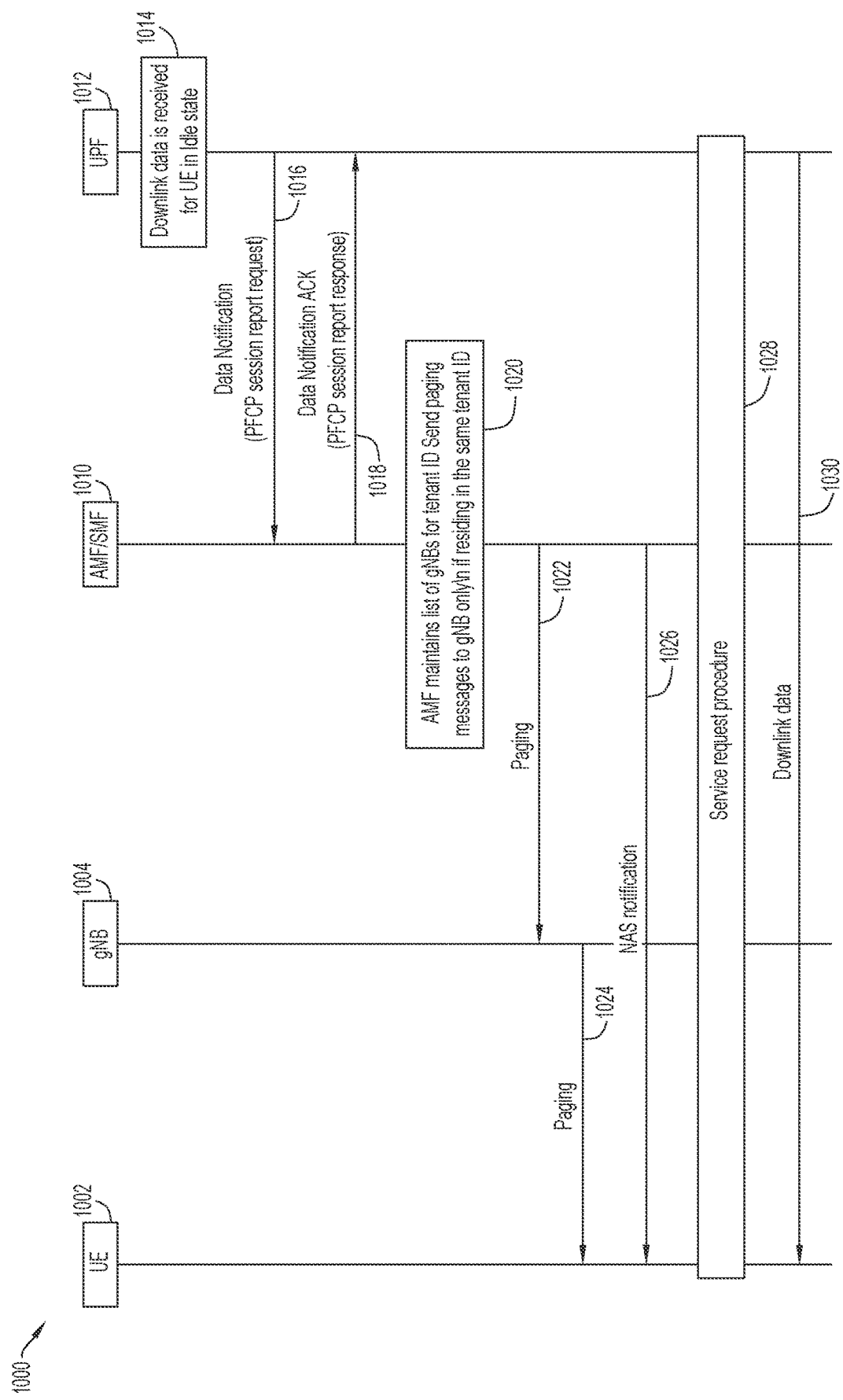
FIG. 10 is a sequence diagram illustrating an Access and Mobility Management Function (AMF)/SMF selectively paging a gNB in accordance with an example embodiment.

FIG. 10 is a sequence diagram 1000 illustrating an AMF/SMF selectively paging a gNB in accordance with an example embodiment. FIG. 10 shows a UE 1002, gNB 1004, AMF/SMF 1010, and a UPF instance 1012. The sequence diagram 1000 shows that downlink data is received for the UE 1002, which is in an idle state, in step 1014. The UPF instance 1012 sends, at 1016, a data notification to the AMF/SMF 1010. The data notification sent at 1016 is a PFCP session report request. Upon receiving the data notification in communication 1016, the AMF/SMF acknowledges the data notification via a data notification acknowledgment in communication 1018.

As discussed above with respect to FIG. 2, the AMF/SMF 1010 maintains mapping of tenant identifiers to one or more gNBs that are specifically configured to service said tenant. Thus, upon receiving the data notification in communication 1016, the AMF/SMF 1010 searches, in step 1020, its list to identify which one or more gNBs are configured to service the tenant specified in the data notification received in communication 1016. As a result of the search, the AMF/SMF 1010 identifies the gNB 1004 as at least one gNB assigned to the specified tenant, and therefore sends a paging message at communication 1022 to the gNB 1004. The gNB transmits a paging message in communication 1024 to the UE 1002. The AMF/SMF 1010 also sends a non-access stratum (NAS) notification in communication 1026 to the UE 1002. After a service request procedure 1028, the UPF instance 1012 sends the downlink data in communication 1030 to the UE 1002.

Figure 11:
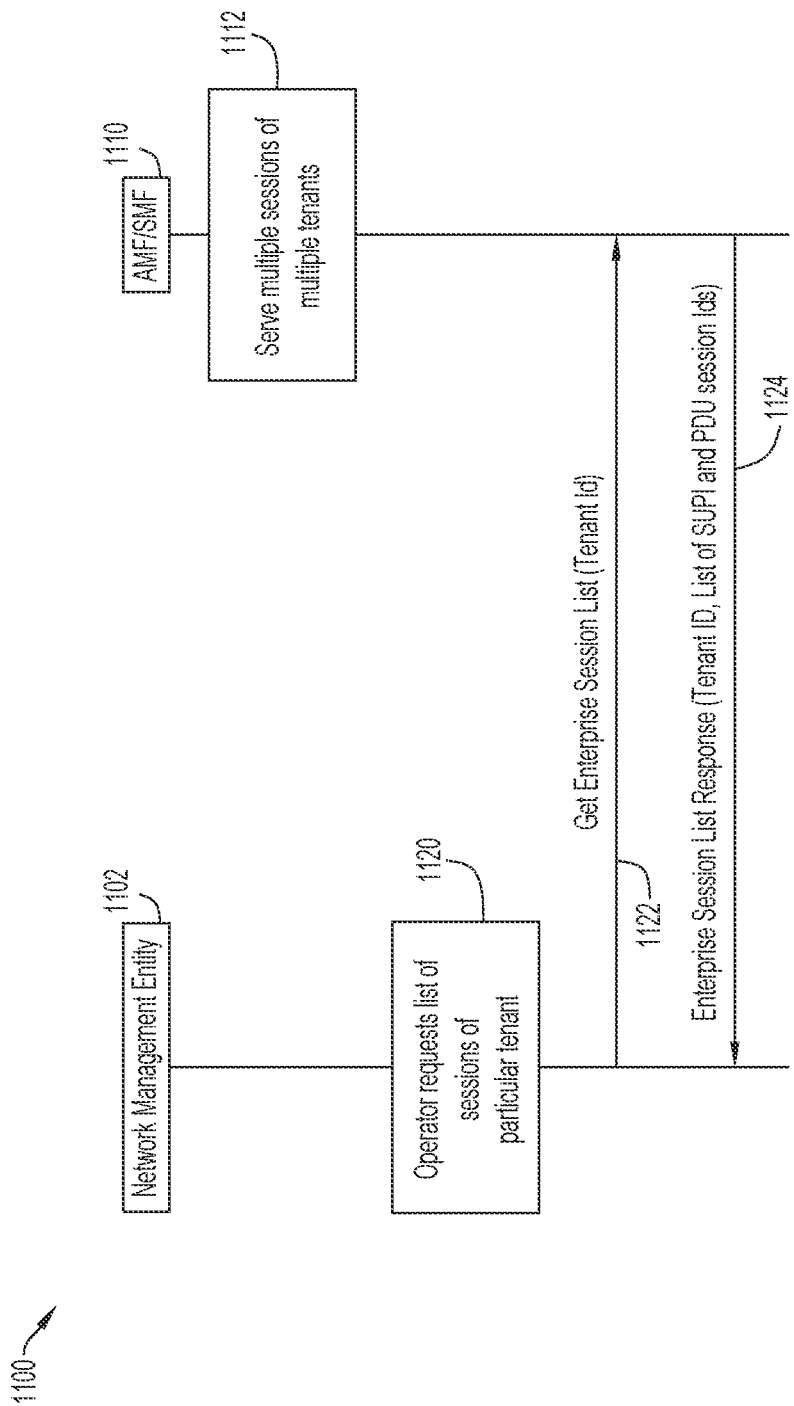
FIG. 11 is a sequence diagram illustrating a network management entity obtaining a tenant specific session list from an AMF/SMF.

FIG. 11 is a sequence diagram 1100 illustrating a network management entity obtaining a tenant specific session list from an AMF/SMF. The sequence diagram 1100 shows a network management entity 1102 and an AMF/SMF 1110. The AMF/SMF 1110 services, in step 1112, multiple sessions on behalf of multiple different tenants having different tenant identifiers. An operator requests, in step 1120, a list of session identifiers associated with a particular tenant. To obtain the tenant specific list of sessions, the network management entity 1102 generates a get enterprise session list request at communication 1122, and passes the tenant identifier to the AMF/SMF 1110. Upon receiving the request, the AMF/SMF 1110 collects session specific information for the specified tenant, and returns the information in a session list response in communication 1124.

While FIG. 11 illustrates collection of session information, a similar approach is used, in other embodiments, to collect key performance indicator (KPI) information. For example, in some embodiments, the AMF/SMF provisions session KPIs to the network management entity 1102, and includes a tenant identifier along with the KPIs. The network management entity then maintains a list of sessions mapping with tenant identifiers. This can be used, in some embodiments, for assurance purposes.

Figure 12:
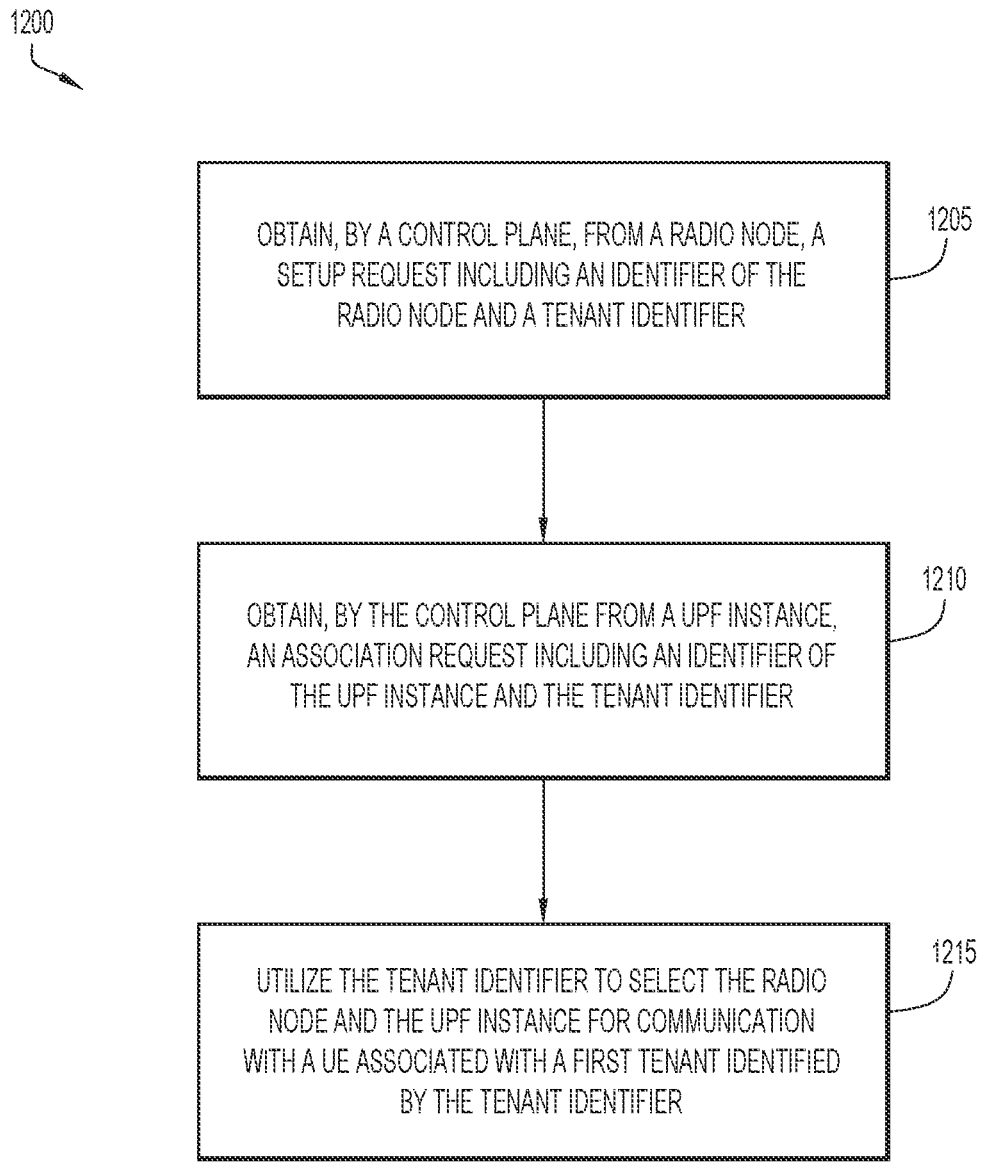
FIG. 12 flowchart of a method of applying a tenant specific policy to a UPF instance assigned to the tenant.

FIG. 12 flowchart of a method of applying a tenant specific policy to a UPF instance assigned to the tenant. In some embodiments, one or more of the functions discussed below with respect to method 1200 or FIG. 12 is performed by an AMF or an SMF within a managed service providers computing infrastructure.

In operation 1205, a setup request is obtained from a radio node. The setup request includes an identifier of the radio node and a tenant identifier. In some embodiments, the setup request is an NG SETUP REQUEST, compatible with the NG Application Protocol (NGAP) defined by the European Telecommunications Standards Institute (ETSI) and the 3GPP. In some embodiments, the setup request includes one or more of the fields discussed above with respect to the NG setup request message 500 and FIG. 5. Some embodiments of operation 1205 include parsing or otherwise decoding the setup request message to extract values of the tenant identifier and/or an identifier of the radio node. An example of a setup request obtained in operation 1205 is discussed above with respect to FIG. 3, where a gNB 302 reads configuration information and determines a tenant identifier associated with the gNB, and then sets the NG SETUP REQUEST message at communication 308 to the AMF/SMF 304. In some embodiments, in response to receiving the setup request, a control plane stores a mapping that indicates an association between the radio node and the tenant identified via the tenant identifier. This mapping is utilized, in some embodiments, to route incoming data to the gNB when attempting to communicate the data to a UE associated with the tenant.

In operation 1210, an association request is obtained from a UPF instance. The association request includes an identifier of the UPF instance, and a tenant identifier of a tenant with which the UPF instance is associated. In some embodiments, the association request obtained in operation 1210 is a PFCP association setup request, analogous to the PFCP association setup request message of communication 608 discussed above with respect to FIG. 6. In some embodiments, the association request indicates a tenant identifier of a tenant associated with the UPF instance. In some embodiments, the association request includes one or more of the fields discussed above with respect to any of FIGS. 7A-7C. For example, the tenant identifier is, in some embodiments, described by a tenant IE, analogous to the tenant IE 400 discussed above with respect to FIG. 4. In some embodiments, the tenant IE is included in the tenant IE field 776, discussed above with respect to FIG. 7C.

In some embodiments of operation 1210, a control plane stores a mapping of the tenant identifier and information identifying the UPF instance. In some embodiments, the UPF instance is identified via one or more of a hostname, IP address, or network port upon which the UPF instance is listening for network messages.

In operation 1215, the tenant identifier is utilized to select a radio node and a UPF instance for communication with a UE associated with the first tenant, which is identified by the tenant identifier discussed above with respect to operations 1205 and 1210. For example, as discussed above with respect to FIG. 1, a UE is identified, in some embodiments, via a SUPI. In some embodiments, a control plane (e.g. such as the CP 104 discussed above with respect to FIG. 1 or FIG. 2, maintains a mapping of a tenant identifier to a SUPI. Thus, if the control plane is presented with a SUPI of a UE, the control plane is able to determine to which tenant the UE is associated. The control plane is then able to also determine a UPF instance to provide communication services to the UE (e.g. a UPF associated with the same tenant as the UE).

Thus, in some embodiments, a control plane searches mappings maintained by the control plane to identify a UPF instance based on the tenant identifier. The control plane is also able to search for one or more radio nodes (e.g., gNBs) associated with the tenant identifier. Thus, for example, when a control plane receives a downlink data notification from a UPF instance, the control plane is able to determine which tenant is associated with a destination of the data. (e.g., by searching mappings maintained by the control plane of SUPIs to tenant identifiers, and/or by determining a tenant associated with a UPF instance providing the DDN. Based on the tenant, the control plane is able to identify one or more radio nodes associated with the tenant. The identified radio nodes are then each individually notified of the incoming DDN (e.g. via a paging request message). If one of the notified radio nodes is in communication with the destination UE, the data can then be delivered to the UE by the radio node.

In some embodiments, the control plane allocates one or more resource pools or groups of compute resources to each of a plurality of different tenants. Resources in the allocated pools are for the exclusive use of communications that occur on behalf of the respective tenant. Thus, for example, some embodiments allocate a pool of IP addresses to each of a plurality of tenants. When an IP address is needed to perform an operation on behalf of a UE associated with a tenant (e.g., in response to a PDU session establishment request sent by the UE), an IP address is selected from the group of compute resources allocated to the tenants IP address resource pool. The selected compute resource is then utilized to provide services to the UE. If there are no IP addresses available, the operation is rejected or otherwise denied, at least in some embodiments (e.g., by sending a session establishment reject message). This can be the case even if, in some embodiments, other tenants have IP addresses available for use. An example of resource allocation via a pool is provided above with respect to FIG. 9.

Some embodiments associate one or more policies with a tenant. Thus, a control plane applies a first policy to communications that occur on behalf of a first tenant and a second policy to communications that occur on behalf of a second tenant. The tenant specific polices reference, in some embodiments, tenant specific access control lists and/or tenant specific quality of service parameters. For example, a first tenant may be configured to receive a higher quality of service than a second tenant in some embodiments. In some embodiments, application of the tenant specific policy is performed by a PCF instance (e.g. analogous to the PCF instance 250 discussed above with respect to FIG. 2).

Figure 13:
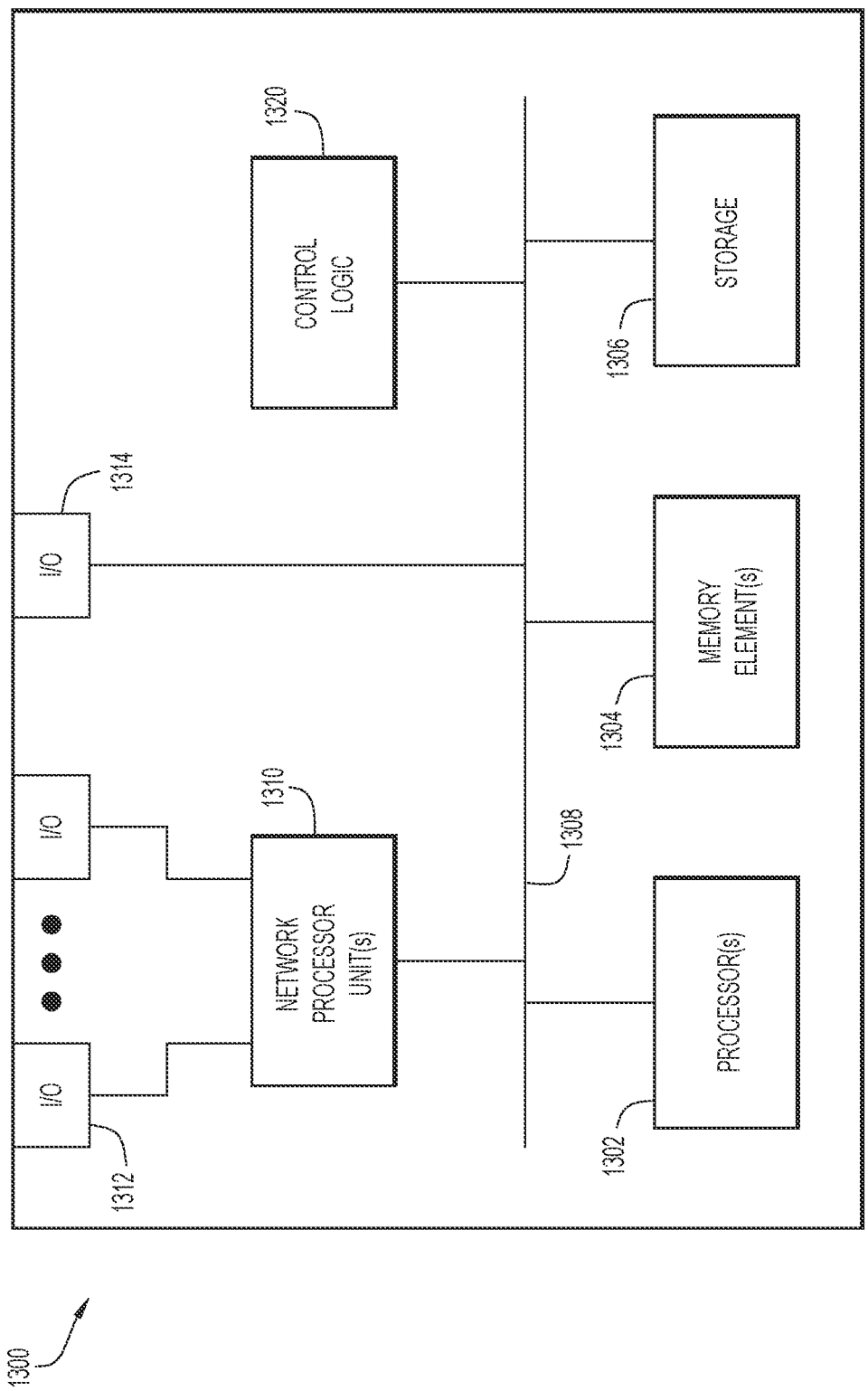
FIG. 13 is a hardware block diagram of a device that may perform functions associated with operations discussed herein in connection with the techniques depicted in any one or more of FIGS. 1-12.

FIG. 13 is a hardware block diagram of a device 1300 that may perform functions associated with operations discussed herein in connection with the techniques depicted in any one or more of FIGS. 1-12. In various embodiments, any of the components described above (e.g., a control plane, user plane, AMF/SMF, PCF, UDM) include, in some embodiments, a computing architecture analogous to that described below with respect to the device 1300.

In at least one embodiment, the device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for device 1300 can overlap in any manner and are not limited to the specific allocation of instructions and/or operations described herein.

In at least one embodiment, processor(s) 1302 is/are at least one hardware processor configured to execute various tasks, operations and/or functions for device 1300 as described herein according to software and/or instructions configured for device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with device 1300, and/or logic configured for memory element(s) 1304 and/or storage 1306. For example, any logic described herein (e.g., control logic 1320) can, in various embodiments, be stored for device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of device 1300 to communicate in order to exchange information and/or data. Bus 1308 can be implemented with any architecture designed for passing control, data and/or information between processors, memory elements/storage, peripheral devices, and/or any other hardware and/or software components that may be configured for device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between device 1300 and other systems, devices, or entities, via network I/O interface(s) 1312 (wired and/or wireless) to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1300 and other systems, devices, or entities to facilitate operations for various embodiments described herein. In various embodiments, network I/O interface(s) 1312 can be configured as one or more Ethernet port(s), Fibre Channel ports, any other I/O port(s), and/or antenna (s)/antenna array(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to device 1300. For example, I/O interface(s) 1314 may provide a connection to external devices such as a keyboard, keypad, a touch screen, and/or any other suitable input and/or output device now known or hereafter developed. This may be the case, in particular, when the device 1300 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 1300 serves as a user device as described herein.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), Institute of Electrical and Electronics Engineers (IEEE) 802.11, Wi-Fi®/Wi-Fi6®, IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises obtaining, by a control plane of a mobile network, from a first radio node, a setup request including an identifier of the first radio node and a tenant identifier, obtaining, by the control plane from a UPF instance, an association request including an identifier of the UPF instance and the tenant identifier; and utilizing, by the control plane, the tenant identifier to select the first radio node and the UPF instance for communication with a user equipment (UE) associated with a first tenant identified by the tenant identifier.

In another form, an apparatus is provided that comprises a network interface configured to enable network communications, one or more processors, and one or more memories storing instructions that when executed configure the one or more processors to perform operations comprising obtaining, by a control plane of a mobile network, from a first radio node, a setup request including an identifier of the first radio node and a tenant identifier, obtaining, by the control plane from a UPF instance, an association request including an identifier of the UPF instance and the tenant identifier; and utilizing, by the control plane, the tenant identifier to select the first radio node and the UPF instance for communication with a user equipment (UE) associated with a first tenant identified by the tenant identifier.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

We claim:

1. A method, comprising:
    obtaining, by a control plane node of a mobile network, from a first radio node, a setup request including an identifier of the first radio node and a tenant identifier;
    obtaining, by the control plane node from a user plane function (UPF) instance, an association setup request for the UPF instance, the association setup request including an identifier of the UPF instance and the tenant identifier, wherein the setup request and the association setup request are obtained by the control plane node before obtaining a session establishment request for at least one user equipment (UE); and
    utilizing, by the control plane node, the tenant identifier to select the first radio node and the UPF instance for communication with a UE associated with a first tenant identified by the tenant identifier upon obtaining a session establishment request for the UE.

2. The method of claim 1, further comprising storing, by the control plane node, a mapping of the identifier of the UPF instance to the tenant identifier, wherein the control plane node includes a session management function (SMF), and storing, by the control plane node, a second mapping of the identifier of the first radio node to the tenant identifier.

3. The method of claim 2, further comprising:
    obtaining, from the UPF instance, a downlink data notification indicating data addressed to the UE;
    determining, based on the downlink data notification, the UE is associated with the first tenant;

first identifying, based on the UE association with the first tenant, the first radio node based on the second mapping of the identifier of the first radio node and the first tenant; and paging, by the control plane node, via the first radio node, the UE, the paging indicating data indicated by the downlink data notification.

4. The method of claim 3, further comprising second identifying a second radio node based on a second mapping of the second radio node to the first tenant, and paging, via the second radio node, the UE based on the second identifying, the second paging indicating the data.

5. The method of claim 3, further comprising second identifying a second radio node based on a second mapping of the second radio node to the first tenant, and paging, via the second radio node, the UE based on the second identifying, the second paging indicating the data.

6. The method of claim 1, further comprising:
allocating, by the control plane node, a first group of compute resources to the first tenant and a second group of compute resources to a second tenant;
selecting, based on the UE being associated with the first tenant, a compute resource from the first group of compute resources; and
utilizing the selected compute resource to communicate with the UE.

7. The method of claim 6, wherein the first group of compute resources includes a pool of Internet Protocol (IP) addresses allocated to the first tenant.

8. The method of claim 7, further comprising:
obtaining, by the control plane node, a session establishment request from a second UE, the second UE associated with the second tenant;
determining, by the control plane node and in response to the session establishment request, the second group of compute resources is exhausted; and
rejecting, by the control plane node, the session establishment request based on the exhaustion.

9. The method of claim 1, further comprising:
assigning a quality of service policy to the first tenant;
storing, by the control plane node, a mapping of the quality of service policy to the first tenant based on the assigning; and
applying, based on the assigning, the quality of service policy to the UPF instance.

10. The method of claim 9, further comprising:
assigning, by the control plane node, a first access control list to the first tenant;
storing, by the control plane node, a second mapping of the first access control list to the first tenant based on the assigning;
obtaining, by the control plane node, the session establishment request initiated by the UE;
determining the UE is associated with the first tenant; and
applying, based on the UE being assigned to the first tenant and the second mapping, the first access control list to the session establishment request.

11. The method of claim 1, further comprising receiving, by the control plane node, a request for a list of sessions of a particular tenant, and providing, in response to the request, a list of session identifiers.

12. An apparatus, comprising:
a network interface configured to enable network communications;
one or more processors; and
one or more memories storing instructions that when executed configure the one or more processors to perform operations comprising:
obtaining, by a control plane node of a mobile network, from a first radio node, a setup request including an identifier of the first radio node and a tenant identifier;
obtaining, by the control plane node from a user plane function (UPF) instance, an association setup request for the UPF instance, the association setup request including an identifier of the UPF instance and the tenant identifier, wherein the setup request and the association setup request are obtained by the control plane node before obtaining a session establishment request for at least one user equipment (UE); and
utilizing, by the control node plane, the tenant identifier to select the first radio node and the UPF instance for communication with a UE associated with a first tenant identified by the tenant identifier upon obtaining a session establishment request for the UE.

13. The apparatus of claim 12, the operations further comprising storing, by the control plane node, a mapping of the identifier of the UPF instance to the tenant identifier, wherein the control plane node includes a session management function (SMF), and storing, by the control plane node, a second mapping of the identifier of the first radio node to the tenant identifier.

14. The apparatus of claim 13, wherein the identifier of the UPF instance includes at least one of: an Internet Protocol (IP) address of the UPF instance, a network port number of the UPF instance, or a node identifier of the UPF instance.

15. The apparatus of claim 13, the operations further comprising:
obtaining, from the UPF instance, a downlink data notification indicating data addressed to the UE;
determining, based on the downlink data notification, the UE is associated with the first tenant;
first identifying, based on the UE association with the first tenant, the first radio node based on the second mapping of the identifier of the first radio node and the first tenant; and
paging, by the control plane node, via the first radio node, the UE, the paging indicating data indicated by the downlink data notification.

16. The apparatus of claim 15, the operations further comprising second identifying a second radio node based on a second mapping of the second radio node to the first tenant, and paging, via the second radio node, the UE based on the second identifying, the second paging indicating the data.

17. A non-transitory computer readable storage medium comprising instructions that when executed configure one or more processors to perform operations comprising:
obtaining, by a control plane node of a mobile network, from a first radio node, a setup request including an identifier of the first radio node and a tenant identifier;
obtaining, by the control plane node from a user plane function (UPF) instance, an association setup request for the UPF instance, the association setup request including an identifier of the UPF instance and the tenant identifier, wherein the setup request and the association setup request are obtained by the control plane node before obtaining a session establishment request for at least one user equipment (UE); and
utilizing, by the control plane node, the tenant identifier to select the first radio node and the UPF instance for communication with a UE associated with a first tenant identified by the tenant identifier upon obtaining a session establishment request for the UE.

18. The non-transitory computer readable storage medium of claim 17, the operations further comprising storing, by the control plane node, a mapping of the identifier of the UPF instance to the tenant identifier, wherein the control plane node includes a session management function (SMF), and storing, by the control plane node, a second mapping of the identifier of the first radio node to the tenant identifier.

19. The non-transitory computer readable storage medium of claim 18, the operations further comprising:
   obtaining, from the UPF instance, a downlink data notification indicating data addressed to the UE;
   determining, based on the downlink data notification, the UE is associated with the first tenant; and
   first identifying, based on the UE association with the first tenant, the first radio node based on the second mapping of the identifier of the first radio node and the first tenant; and
paging, by the control plane node, via the first radio node, the UE, the paging indicating data indicated by the downlink data notification.

20. A method performed by a control plane node of a mobile network, comprising:
   obtaining, from a first radio node, a setup request including an identifier of the first radio node and a tenant identifier;
   obtaining, from a user plane function (UPF) instance, an association setup request including an identifier of the UPF instance and the tenant identifier;
   utilizing the tenant identifier, selecting the first radio node and the UPF instance for communication with a user equipment (UE) associated with a first tenant identified by the tenant identifier;
   assigning a quality of service policy to the first tenant;
   storing, based on the assigning, a mapping of the quality of service policy to the first tenant; and
   applying, based on the assigning, the quality of service policy to the UPF instance.

21. The method of claim 20, further comprising:
   allocating, by the control plane node, a first group of compute resources to the first tenant and a second group of compute resources to a second tenant;
   selecting, based on the UE being associated with the first tenant, a compute resource from the first group of compute resources; and
   utilizing the selected compute resource to communicate with the UE.

22. The method of claim 21, wherein the first group of compute resources includes a pool of Internet Protocol (IP) addresses allocated to the first tenant.

23. The method of claim 20, wherein the control plane node includes a Session Management Function (SMF).

* * * * *